United States Patent [19]
Petersen

[11] Patent Number: 4,746,980
[45] Date of Patent: May 24, 1988

[54] VIDEO PROCESSING SYSTEM

[76] Inventor: Alfred C. Petersen, 7223 N. Hamilton, Chicago, Ill. 60645

[21] Appl. No.: 697,901

[22] Filed: Feb. 4, 1985

[51] Int. Cl.4 .............................................. H04N 5/14
[52] U.S. Cl. ..................................... 358/160; 358/22; 358/280
[58] Field of Search ................. 358/160, 183, 22, 166, 358/280; 382/44, 45

[56] References Cited

U.S. PATENT DOCUMENTS

| 4,148,070 | 4/1979 | Taylor | 358/141 |
| 4,205,241 | 5/1980 | Fisher | 307/361 |
| 4,238,768 | 12/1980 | Mitsuya et al. | 358/135 |
| 4,319,267 | 3/1982 | Mitsuya et al. | 358/75 |

OTHER PUBLICATIONS

Righter, "Using 64K Drams in Graphics Applications"; Electronic Imaging; Nov. 1983, pp. 62-71.

Primary Examiner—James J. Groody
Assistant Examiner—Michael D. Parker
Attorney, Agent, or Firm—Mason, Kolehmainen, Rathburn & Wyss

[57] ABSTRACT

A system for digitizing, displaying and storing video images utilizing independent horizontal and vertical control circuitry to achieve the digitizing, storage and display functions. The independent control permits any of the pixels on a line to be independently sampled and digitized so that more resolution may be obtained in areas of interest without requiring excessive memory capacity. Similarly, any line or lines may be sampled to increase resolution in areas of interest. All or less than all of the stored video pixels may be displayed in patterns that are either the same as or different than those of the original video image.

36 Claims, 3 Drawing Sheets

VIDEO PROCESSING SYSTEM

BACKGROUND OF THE INVENTION

A. Field of the Invention

This invention relates generally to imaging systems and more particularly to image acquisition systems that acquire and digitize a video image for subsequent display or storage, wherein predetermined areas of interest of the image may be selected for digitization and wherein various portions of the image may be displayed with varying degrees of resolution.

B. Description of the Prior Art

Various imaging systems are known including special effects generators that modify the video field to create special effects, and specialized imaging systems that may be used in the medical field and for industrial and scientific applications. Such systems include systems for measuring time varying phenomena that occur very rapidly or very slowly and systems that track the movement of points of interest as such a point moves from frame to frame. Examples of prior art imaging systems are disclosed in "Using 64K DRAMS In Graphics Applications", Electronic Imaging, November, 1983 pp. 62–71 and in U.S. Pat. Nos. 4,205,341, 4,238,768 and 4,319,267.

While the imaging systems of the prior art are generally useful for their intended purposes, it would be desirable to provide a system and method for selectively acquiring digital information representing desired pixels of an image array in order to select pixels representing areas of interest, and to vary the spacings between acquired pixels to provide greater resolution in the areas of interest, and to display such pixels in patterns and spacings that are either the same as or different than the pixel spacings of the original acquired image array.

SUMMARY OF THE INVENTION

Accordingly, it is an object of the present invention to provide a new and improved image acquisition and processing system.

It is another object of the present invention to provide an image acquisition system that is capable of acquiring information from any predetermined pixels in an array and digitizing such information for subsequent display or storage.

It is yet another object of the present invention to provide a system that has independently operated horizontal and vertical sampling and control systems to permit information from any pixel in any horizontal line to be digitized, displayed or stored.

It is yet another object of the present invention to provide an image acquisition and display system wherein information from pixels in an array may be acquired in any desired pattern and spacing and displayed in the same or different pattern and spacing.

It is another object of the invention to provide a video acquisition and display system having independently controlled variable vertical and horizontal resolution.

It is yet another object of the present invention to provide a system for acquiring digital information for transmission along a communications link such as a telephone line wherein the information to be transmitted may be viewed prior to transmission.

It is yet another object of the present invention to provide a two-way video transmission system that utilizes a single monitor at each end wherein the information being transmitted is displayed on one half of the screen and the received information on the other half.

It is another object of the present invention to provide a video display that may be horizontally and vertically scrolled.

Briefly, in accordance with a preferred embodiment of the invention, an image from a video source having a predetermined number of raster lines is digitized by the system. This is accomplished by segmenting each of the horizontal lines into a plurality of pixels to form a pixel array. Independent horizontal and vertical control circuitry is provided to permit any pixel in any line to be independently acquired for digitization or storage. The selection of the individual pixels in each line is controlled by a sample memory (XSAM) that defines which pixels of each line are to be sampled and stored in and image memory. A starting address memory (SAM) controls access to the image memory to determine which lines of stored images are to be displayed. Thus, the X sample memory and the starting address memory cooperate to digitize and store information from predetermined pixels on predetermined lines, and also to display the stored information in the same format as it was acquired or in a different format.

These and other objects and advantages of the present invention will be readily understood upon consideration of the following detailed description and attached drawing, wherein:

FIG. 9 is a block diagram of the system according to the invention used in a split-screen, two-way video communications system.

DETAILED DESCRIPTION OF THE PREFERRED EMBODIMENT

Figure 1:
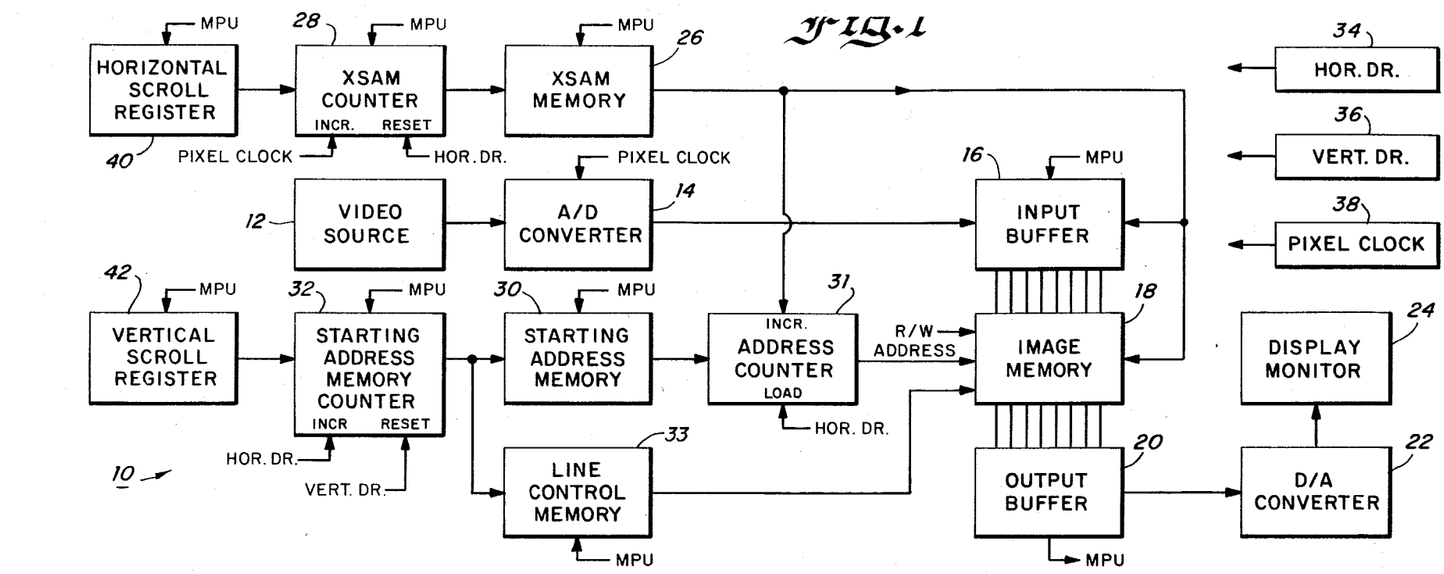
FIG. 1 is a generalized block diagram of the video processing system according to the invention.

Referring now to the drawings, with particular attention to FIG. 1, there is provided a general block diagram of the system according to the inveniton generally designated by the reference numeral 10. The system 10 receives video signals to be processed from a video source 12 which may be, for example, a video camera, a video transmission or a prerecorded video signal. The video signal from the video source 12 is applied to an analog-to-digital converter 14 which samples the video signal at predetermined intervals and provides a digital representation of each sample to an input buffer 16. Each digital representation from the analog-to-digital converter 14 represents one pixel of information. The pixel information is transferred from the input buffer 16 to an image memory 18 which stores the pixel information for subsequent readout. An output buffer 20 receives the information from the image memory 18 and applies it, for example, to a digital-to-analog converter 22 which converts the digitized signal to an analog signal for display on a display monitor 24. The output from the output buffer 20 could also be applied to a transmission medium or recorded on a magnetic disk or the like.

An X sample or XSAM memory 26 controls which of the pixels from the analog to digital converter 14 are to be digitized and otherwise processed. The XSAM memory is controlled by an XSAM counter 28 which is driven at the pixel sampling rate. A starting address memory 30 defines the locations in the image memory 18 that store the information defining the first pixel in each line that is to be digitized or read out. An address counter 31 that is loaded from the starting address memory 30 at the horizontal drive rate and incremented by the XSAM memory addresses the locations in the image memory 18 containing the pixel information. A read/write (R/W) signal applied to the image memory 18 determines if an image is to be digitized or displayed. The starting address memory 30 is driven by a starting address memory counter 32 that is driven at the horizontal drive rate. A line control memory 33 is also driven by the starting address memory counter 32. The line control memory 33 contains information indicating whether a particular line contains any pixels and if so, whether those pixels are to be sampled and digitized or displayed. This information can be contained in two bits. One bit can be used to define whether a particular line has any active pixels or not, with for example, a one indicating that there is at least one active pixel on the line of interest, and a zero indicating that there are none. The other bit can be used to indicate whether a particular pixel is to be digitized or displayed. In the digitize mode, if there are no active pixels on a particular line, the system proceeds to the next line until an active line is found. In the display mode, if there are no active pixels on a particular line, and that line occurs within the image, the previous line is repeated until a line with active pixels to be displayed is found. If the line with no active pixels occurs outside the image area, nothing is displayed. This results in a black border above and below the image. The black border can also be made to appear at the sides of the image by not displaying the pixels at the pixels at the beginning and end of each line.

In an alternative embodiment, instead of storing the starting address for each line in the starting address memory 30, the starting address of each image may be stored. In such an event, the starting address memory counter 32 would be incremented at the beginning of each image, for example, at the vertical drive rate, and the address counter 31 would be loaded at the same rate. The address counter 31 would continue to be incremented by the XSAM memory 26 to sequentially address all of the active pixel locations defining an image in the image memory 18. In addition, the starting address memory 30, starting address memory counter 32, and vertical scroll register 42, could be deleted, and the MPU could load the starting address of the image at each vertical drive time.

A horizontal drive circuit 34 and a vertical drive circuit 36 generate drive signals at the horizontal scanning and vertical scanning frequencies, respectively, while a pixel clock 38 generates a timing signal at the pixel sampling frequency, which corresponds to a 70 nanosecond sampling time in the present embodiment. A horizontal scroll register 40 and a vertical scroll register 42 can be used to load a predetermined starting number into the XSAM counter 28 and the starting address memory counter 32, respectively, in order to pan the displayed image horizontally or to scroll it vertically. Data defining the various pixels to be digitized or displayed may be input into the various counters and memories (e.g. memories 26, 30, 33, counters 28, 32 and registers 40, 42) by an external computer (MPU) such as, for example, and IBM PC or other computer.

The system according to the invention is operable in three different modes, namely, a digitizing mode wherein a video input signal is digitized for storage, display or subsequent processing, a storage mode where a digitzed signal from the system or from another digitized signal source is stored, and a display mode wherein images are retrieved from the image memory and displayed or otherwise utilized.

The line control memory 33 defines which lines of the raster contain at least one pixel to be digitized. Thus, the line control memory contains at least one address location for each line of the raster. If a particular line contains at least one pixel to be sampled, then the address location corresponding to that line contains a first digital indication, for example, a 1. If that line contains no such pixels, than a second digital indication, such as, for example, a 0 is stored in that address location. The XSAM memory 26 defines which of the pixels of the various lines defining a video frame are to be digitized. To provide this function, the XSAM memory 26 must contain one memory location for each pixel in the video array. For example, in a practical system, the information necessary to select individual pixels in an image array containing 480 lines of 752 pixels each can readily be stored in the XSAM memory 26, and in its simplest form, only a single bit is necessary to define whether or not a particular pixel is to be sampled. For example, a 1 in the XSAM memory 26 corresponding to a particular pixel indicates that that pixel is to be sampled, while a zero can be used to indicate that the pixel is not to be sampled. Thus, as the XSAM counter 28 is incremented at the pixel clock rate, the memory locations in the XSAM memory 26 are sequentially addressed, and the data from a particular pixel is either digitized or not depending on whether a 1 or a 0 is present at the memory location associated with that pixel.

Figure 2:
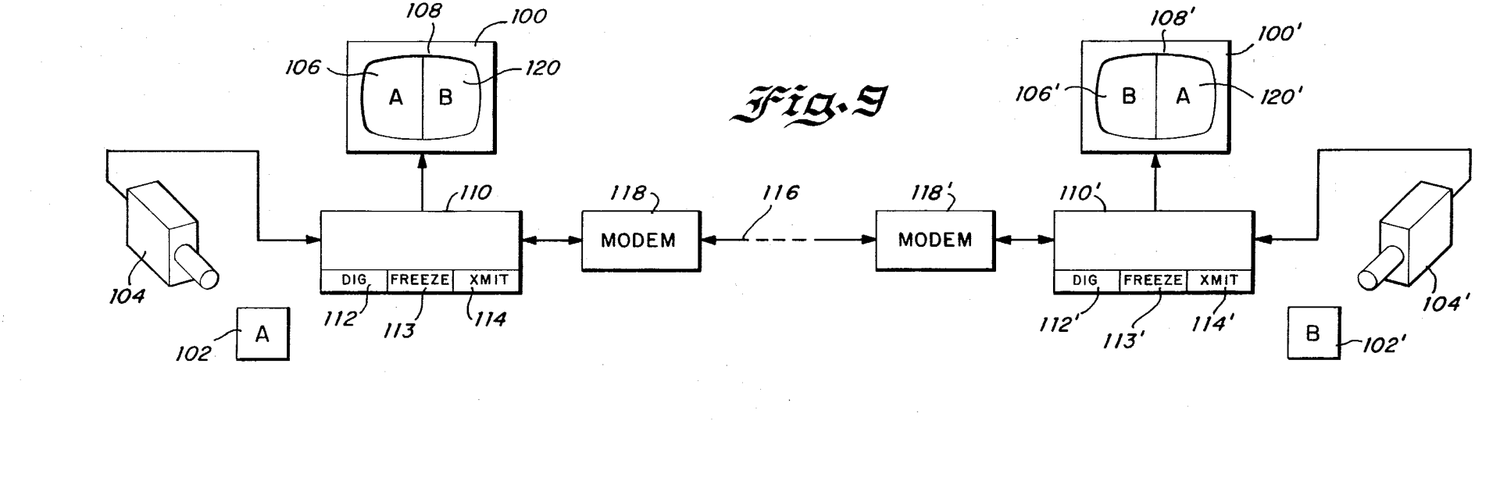
FIG. 2 is an illustration showing the storage of pixel sampling information in the X sample memory.

The XSAM memory 26 is illustrated in its simplest form in FIG. 2. In the example illustrated in FIG. 2, the XSAM memory 26 contains 752 address locations each corresponding to one of the pixels on one horizontal line. The one or zero associated with each address indicates whether or not the corresponding pixel is to be sampled. The XSAM memory 26 in its simplest form may have only 752 address locations, each containing a single bit as shown in FIG. 2, or it can have separate address locations for each pixel of each line, for example, 752 address locations for each of the 480 lines previously discussed. In the simplest case, where only 752 address locations are utilized, pixels located on the same position on each line would be sampled; however, if separate address locations are provided for each pixel on each line, different pixel positions can be selected for each horizontal line. If separate address locations are provided for each pixel on each line, the line control memory could be eliminated if desired because the sampling of each pixel in the raster could be individually controlled by the XSAM memory. Also, additional bits of storage can be associated with each pixel to provide control functions or other functions as will be discussed in a subsequent portion of the specification.

When digitizing, the sampled pixels are loaded into successive storage locations of the image memory 18. For example, if the pixels of line 1 (FIG. 3) were digitized in accordance with the data stored in the XSAM memory 26 (FIG. 2), pixels 1, 3 and 5 would be stored in memory locations 1-3 of the image memory 18, pixels 7-11 would be stored in locations 4-8 and pixels 13, 15, 17 and 19 would be stored in addressed locations 9-12. The last pixel, pixel 752 would be stored in, for example, location 50. The first pixel of the next line to be digitized, which in the illustrated example is pixel 1' of line 3, would be stored in the next location of the image memory 18, or as in the illustrated embodiment, location 51. Data defining subsequent pixels would then be stored in successive mmeory locations. In the present embodiment, the data defining each pixel is an 8-bit word, and the image memory has sufficient capacity to store data defining each of the 752 pixels forming each of the 480 lines; however, in the example illustrated in FIG. 3, not all of the pixels were digitized. This permits more than one frame of video to be digitized and stored in the memory 18 when a lower resolution image is acceptable.

When the digitized image is displayed, the digitized pixels must be retrieved from the image memory 18 in the proper sequence in order to generate the desired image. This is accomplished by the starting address memory 30, the address counter 31 and the starting address memory counter 32. The starting address memory counter 32 is incremented at the horizontal drive rate and reset at the vertical drive rate. Thus, the address locations in the starting address memory 30 are sequentially addressed at the horizontal drive rate in order to define a starting address in the image memory 18 for each horizontal line to be displayed. The starting address from the starting address memory 30 is loaded into the address counter 31 at the horizontal drive rate so that at the beginning of each line the starting address of the first pixel in that line is contained in the address counter 31. The address counter 31 is incremented by the output of the XSAM memory 26 so that the address of the next pixel on the line of interest is provided to the image memory 18 each time a new pixel is to be displayed.

Figures 2, 3, 4, 5:
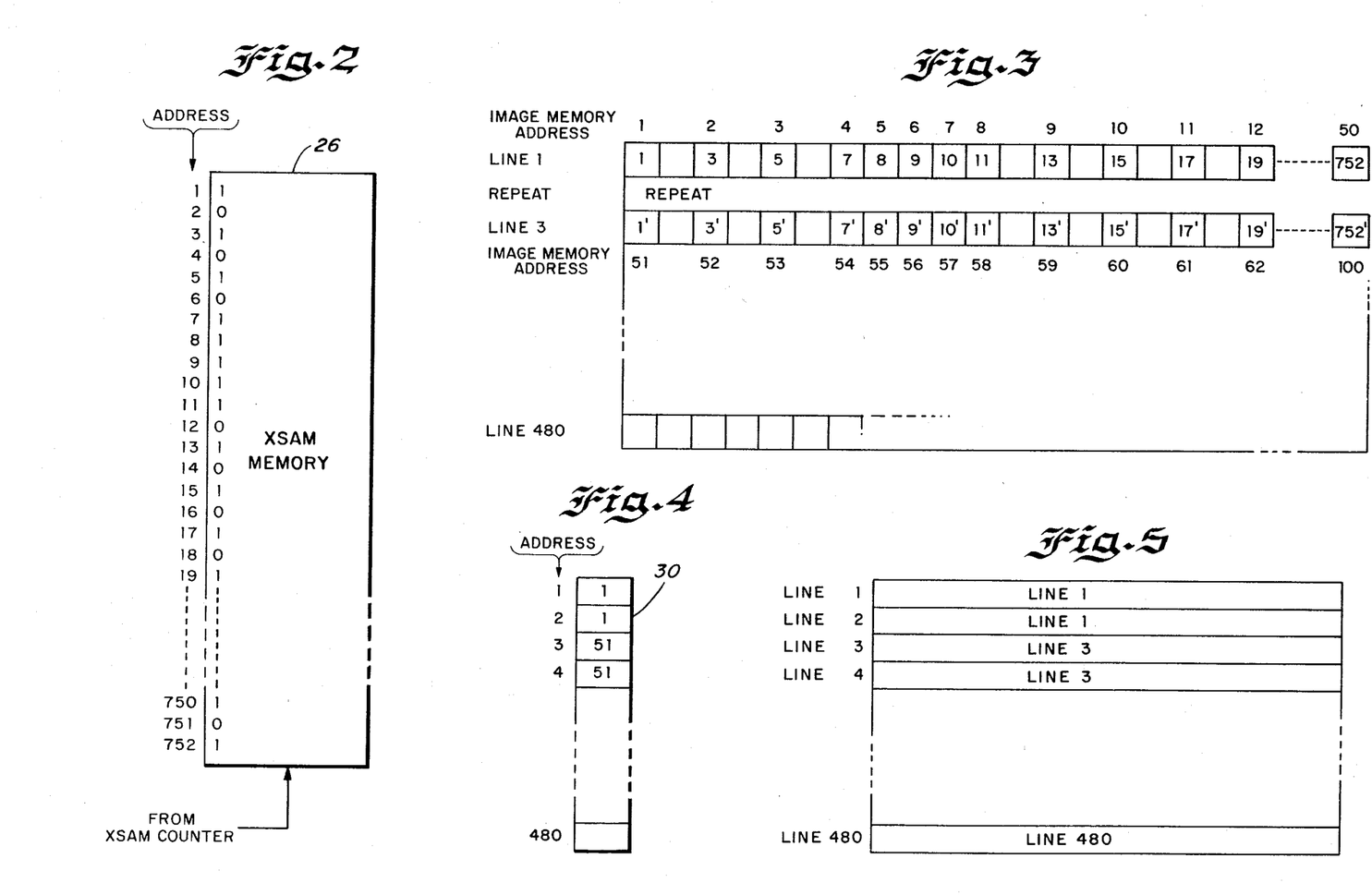
FIG. 3 is an illustration showing how individual pixels are acquired and displayed, and how lines may be repeated.
FIG. 4 illustrates the storage of starting addresses in the starting address memory.
FIG. 5 is an illustration of a raster illustrating how lines may be repeated.

Referring to FIG. 4, the starting address memory 30 contains 480 address locations, one for each of the 480 horizontal lines used in the present embodiment; however, any number of lines and corresponding memory locations could be used, depending the desired resolution. At the beginning of a frame, when the starting address memory counter 32 has been reset by the vertical drive signal, the first horizontal drive signal received sugsequent to the vertical drive signal increments the starting address counter to address location 1 in the starting address memory 30. As is apparent from FIG. 4, address location 1 contains a 1 which address location 1 in the image memory 18 to retrieve the information defining pixel 1 which corresponds to the first pixel on line 1 in FIG. 3. At the same time, the XSAM counter 28 is incremented at the pixel clock rate, thereby sequencing the XSAM memory 26. The output of the XSAM memory 26 sequences through the memory locations of the image memory 18 depending on the data stored in the XSAM memory 26 to retrieve data defining subsequent pixels from the image memory 18. Thus, for the examples shown in FIGS. 2 and 3, the image memory 18 is sequenced through memory locations 1-12 to display pixels 1, 3 and 5, 7-11, 13, 15, 17 and 19. Each time a 1 is applied to the image memory 18 by the XSAM memory 26, the next image location is accessed. When a zero is present, the data from the previous pixel is repeated. The sequence is repeated until the end of the horizontal line is reached at which time the starting address memory counter 32 is again incremented by the horizontal drive signal.

When the horizontal drive signal increments the starting address memory counter 32, the next location of the starting address memory 30 is accessed. In the embodiment illustrated in FIG. 4, address location 2 would be accessed in order to provide the starting address for the second line of the raster. In the example illustrated in FIG. 3, however, the second line is a repeat of line 1. Consequently, the starting address stored in location 2 of the starting address memory 30 is a 1, which is the same starting address as the starting address of line 1. Thus, the same data is displayed on lines 1 and 2. Similarly, the use of the same starting address on lines 3 and 4 (FIG. 4) results in a repetition of line 3 on line 4 of the raster. The repetition of the lines on the raster caused by the starting addresses stored in the starting address memory 30 (FIG. 4) is illustrated in FIG. 5. The image may also be displayed as it is being digitized. In this instance, for example, lines 1 and 3 (FIG. 5) would be digitized and displayed while lines 2 and 4 would be a repeat of the display of lines 1 and 3.

At the end of line 2, the starting address counter 32 is again incremented by the horizontal drive signal and address location 3 of the starting address memory 30 is accessed. As is shown in FIG. 3, the data defining the first pixel 1' of line 3 is stored in address location 51. Consequently, the starting address 51 is stored in location 3 of the starting address memory 30. If it is desired to repeat line 3 on line 4, the starting address 51 would also be stored at address 4 of the memory 30.

Figure 6:
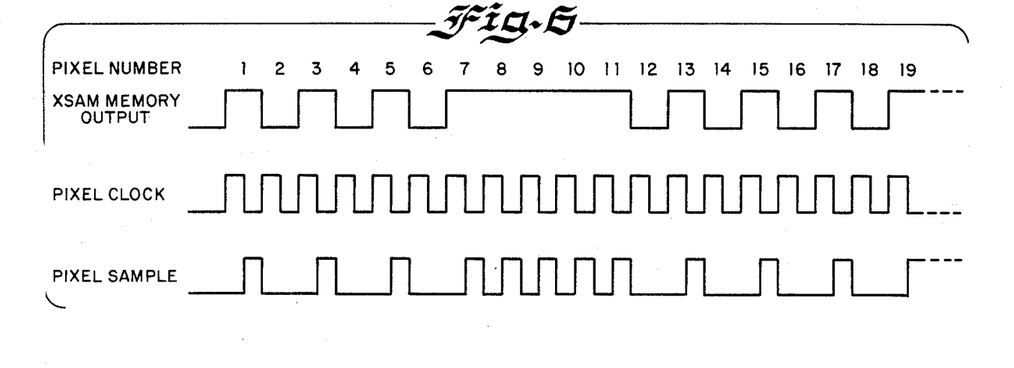
FIG. 6 is a timing diagram showing how the output of the X sample memory may be decoded.

In addition to permitting any pixel to be digitized or displayed, the system according to the invention permits the displayed image to be scrolled either horizontally or vertically or both. Vertical scrolling is readily accomplished by using a register such as the vertical scroll register 42 to load a predetermined starting address into the starting address memory counter 32. For example, in the embodiment illustrated in FIGS. 3 and 4, if the number 2 were loaded into the vertical scroll register, the image would be scrolled up by 1 horizontal line. If the starting address memory 30 and starting address memory counter 32 are provided with sufficient capacity to store information defining at least twice the number of active raster lines that will be displayed on the screen, wrap around will be avoided. Also, information defining any desired background can be stored in the locations in the image memory 18 defining the extra lines. Similarly, horizontal scrolling or panning can be achieved by preloading a predetermined number into the XSAM counter 28 utilizing the horizontal scroll register 40. Thus, the image can be moved horizontally by 1 pixel for each count that is loaded into the horizontal scroll register, As in the case of vertical scrolling, by making the capacity of the XSAM counter equal to at least twice the number of pixels per horizontal line, and providing the XSAM memory 26 with sufficient capacity to define twice as many pixels as are displayed on any horizontal line, wrap around may be avoided. The output of the XSAM memory 26 required to digitize or display line 1 of FIG. 4 is illustrated in FIG. 6. As can be seen from the top graph of FIG. 6, the output of the XSAM memory is high for pixels 1, 3, 5, 7-11, 13, 15, 17 and 19 to indicate that those pixels are to be digitized or displayed. However, the output of the XSAM memory 26 remains high when a continuous number of pixels are to be digitized or displayed, such as, for example, the pixels 7–11 of FIG. 7. Consequently, there are no transitions between pixels 7 and 11 that can be used to increment that various buffers, counters and memories. This makes the output of the XSAM memory 26 difficult to decode. One way to avoid this problem is to store the XSAM data in alternate address locations in the XSAM memory 26 to provide transitions between successive pixel samples. However, such an approach has the disadvantage that the number of storage locations in the XSAM memory 26 must be doubled, as must the speed of the pixel clock.

Figure 7:
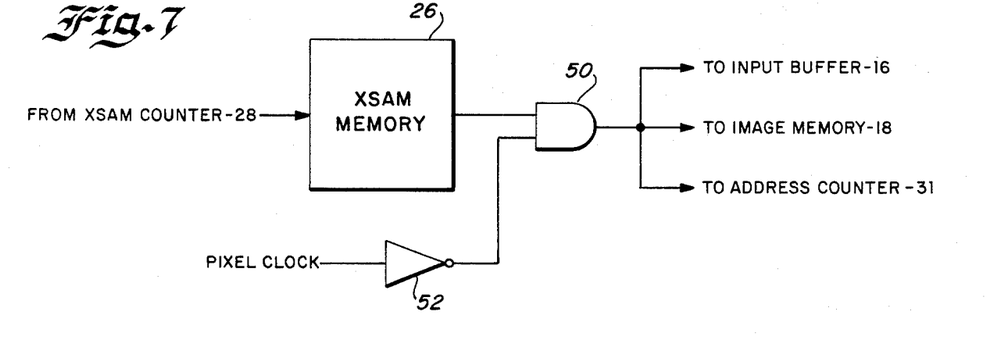
FIGS. 7 and 8 are block diagrams of alternative systems for decoding the output of the X sample memory according to the scheme shown in FIG. 6.

The need for doubling the memory capacity and the speed of the pixel clock is avoided by ANDing the output of the XSAM memory with the pixel clock signal or an inverted version of the pixel clock signal. A simple circuit for providing this function is illustrated in FIG. 7. This function is provided by an AND gate 50 that receives an inverted version of the pixel clock signal from an inverter 52. The output of the AND gate 50 is applied to the input buffer 16, the image memory 18 and the address counter 31 and the input of the XSAM memory 26 is received from the XSAM counter 28.

The operation of the circuit of FIG. 7 is readily apparent from the timing diagram of FIG. 6. Because the pixel clock signal is ANDed with the memory of the XSAM memory output, the width of the resultant pixel sample is reduced to the length of the time that the pixel clock is low (or high if the pixel clock is not inverted). Thus, transitions are introduced into areas without transitions such as between pixel numbers 7–11. Such transitions can readily be detected and used to increment the address counter 31 and the image memory 18 and the input buffer 16.

Figure 8:
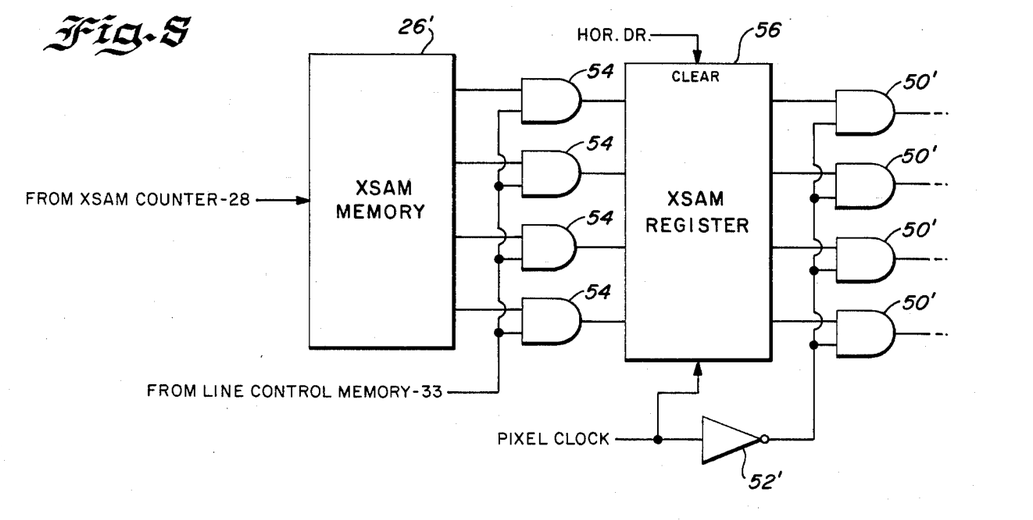

In a system such as the one described herein, for the type of resolution discussed, each pixel must be accessed within approximately 70 nanoseconds. However, a typical low-cost memory, such as, for example, a 64K×1 DRAM has a typical cycle time of 280 nanoseconds. Thus, in order to be able to utilize such a low-cost DRAM, it is necessary to buffer at least four pixels. This is accomplished by the input and output buffers 16 and 20. A simple method to control these buffers is to expand the XSAM memory and decode 2 bits of information to select one of the four input or output buffers. This is accomplished by the circuit of FIG. 8. The system of FIG. 8 is similar to that of FIG. 7 in that it uses four and gates 50' and an inverter 52' instead of a single gate 50 and inverter 52 to introduce transitions into each of the four channels.

In many instances it is desirable to use the system according to the invention to digitize and transmit images to remote locations via a communications link such as, for example, a telephone line. Also, when the system is used to transmit images, it is desirable to have simultaneous two way communications. It is also desirable to be able to digitize and view the image to be transmitted prior to actually transmitting the image to be sure that the desired image is transmitted. However, in order to be able to view the image to be transmitted while simultaneously viewing the image being received requires two display monitors and two digitizing systems. Alternatively, a single display monitor and a switching network that permits either the transmitted or the received image to be viewed may be used, but such an arrangement precludes the simultaneous viewing of the received and transmitted image.

Therefore, in accordance with another important aspect of the present invention, the digitizing system can be used to display both the transmitted and received image in a split screen format on a single video monitor. Such a system is illustrated in FIG. 9. Referring to FIG. 9, a monitor 100 may be used to view an image such as an image on the document 102 with a video camera 104. The image may be displayed for example on the left side 106 of a display or screen 108 on the monitor 100. A control console 110 which contains the video processing circuitry of the system 10 of FIG. 1 is used to digitize and process the image from the camera 104 as required. A digitize control 112 may be activated to cause the system to continuously digitize the image received from the camera 104 and to display the continuously digitized or "live" image on the area 106 of the display screen 108. A "freeze" control 113 may be used to store the digitized image from the camera 104 in the image memory 18 and to display the image thus frozen on the area 106 of the display screen 108. Thus, the digitized image may be viewed by the operator immediately after being digitized, and if it is satisfactory, a transmit control 114 may be actuated in order to transmit the image displayed in the area 106 to a remote location. In a typical system, digital data representative of the image to be transmitted is applied to a communications link such as a telephone line 116 via a modem 118 and received by a similar system having a modem 118', display monitor 100', video camera 104' and a control console 110. In the embodiment illustrated, the video camera 104' views a document 102' which is displayed on the left side 106' of a screen 108'. The image appearing at the left side 106 of the screen 108 appears at the right side 120' of the screen 108', while the image viewed by the camera 104' appears at the right side 120 of the screen 108.

The split screen function can be achieved very simply by adding another bit of information to the XSAM memory 26 to indicate whether to digitize and display video from the local camera 104 or to display data stored in the image memory 18. This information could be applied to the read/write (R/W) input of the image memory 18 to indicate to the memory 18 when to digitize, store and display the signal from the local source such as the camera 104, and when to read out and display the stored image. The digitization and storage or readout of the pixels in the memory 18 defining the locally generated video can be achieved independently of the display of the remotely generated video. This is because each pixel may be independently controlled. By putting an additional bit of information in the XSAM memory defining whether a pixel is to be digitized or displayed, each of the pixels can be independently digitized or displayed. For example, if the address locations defining the left halves of all of the horizontal lines are provided with an additional 1 bit, and if the address locations defining the right halves of all of the horizontal lines are provided with a 0 bit, the locally generated video signal would be digitized and simultaneously displayed on the left half of the screen, while the remotely generated image stored in the memory 18 would be displayed on the right half of the screen.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Apparatus for acquiring image pixels from an image information source defining pixels of an image in a predetermined image array format, the apparatus comprising:

means for acquiring image pixels from the image information source and storing the acquired image pixels in an addressable format;

line control data means having stored therein information defining predetermined lines of said predetermined image array format along which pixels are to be acquired, wherein said line control data means includes a sequential data array having an entry for each line of said predetermined image array format, said entry being a first predetermined digital code for representing that a line includes at least one image pixel to be acquired and a second predetermined digital code for representing that a line does not include any image pixels to be acquired;

pixel sample data means having stored therein information defining predetermined pixels along each of said lines of said predetermined image array which are to be acquired;

means responsive to said line control data means and said pixel sample data means for acquiring the predetermined pixels and controlling the storing of the acquired pixel information in said storing means.

2. The apparatus of claim 1 further comprising starting address control means having stored therein the address at which the first pixel of each image that was acquired is to be stored in said storing means for controlling the addresses at which said storing means stores said pixels.

3. Apparatus for acquiring image pixels from an image information source defining pixels of an image in a predetermined image array format, the apparatus comprising:

means for storing the image pixels in an addressable format;

line control data means having stored therein information defining predetermined lines of said predetermined image array format along which pixels are to be acquired;

pixel sample data means having stored therein information defining predetermined pixels along each of said lines of said predetermined image array which are to be acquired, wherein said pixel sample data means includes a sequential array having an entry for each pixel position of a line in said predetermined image array format, said entry being a first predetermined digital code for representing that a pixel is to be acquired and a second predetermined digital code for representing that a pixel is not to be acquired;

means responsive to said line control data means and said pixel sample data means for acquiring the predetermined pixels and controlling the storing of image information into said storing means.

4. Apparatus as recited in claim 3 further including a source of pixel clock signals having a frequency that is an integral multiple of the horizontal scanning frequency, and means for combining said pixel clock signal with output signals from said pixel sample data means.

5. Apparatus as recited in claim 4 wherein said combining means includes means for providing an AND function.

6. Apparatus for acquiring image pixels from an image information source defining pixels of an image in a predetermined image array format, the apparatus comprising:

means for acquiring image pixels from the image information source and storing the acquired image pixels in an addressable format;

line control data means having stored therein information defining predetermined lines of said predetermined image array format along which pixels are to be acquired;

pixel sample data means having stored therein information defining predetermined pixels along each of said lines of said predetermined image array which are to be acquired;

means responsive to said line control data means and said pixel sample data means for acquiring the predetermined pixels and controlling the storing of the acquired pixels into said storing means;

said apparatus further comprising means for reading out said stored pixels from said storing means, said line control data means further including display control data including an entry for each line of said predetermined image array format, said entry being a first predetermined digital code for each line of said predetermined image array format for which a stored image pixel is to be displayed and a second predetermined digitial code for each line of said predetermined image array format for which a stored image pixel is not to be displayed, said reading out means being responsive to said display control data and said pixel sample data means to control said storing means.

7. The apparatus of claim 6 further comprising starting address control means having stored therein the address at which the first pixel of each image that was acquired is to be stored in said storing means for controlling the addresses at which said storing means stores said image pixels, wherein said storing means is responsive to said starting address control means to control the address from which said reading means reads out said pixels.

8. The apparatus of claim 6 further comprising vertical scroll control means for controlling the vertical display position of each display line, said line control data means being responsive to said vertical scroll control means.

9. The apparatus of claim 6 further comprising horizontal scroll control means for controlling the horizontal display position of each display pixel, said pixel sample data means being responsive to said horizontal scroll control means.

10. The apparatus of claim 1 further including means for displaying the pixels being acquired.

11. A method for selecting predetermined picture elements of selected horizontal lines of a video raster for storage comprising the steps of loading an image memory address counter with a starting address at which picture elements will be written to an image memory, and selecting picture elements at varying intervals on the selected horizontal lines for storage into said image memory at selected addresses.

12. A method for selecting horizontal lines of a video raster for display comprising the steps of loading an image memory address counter with a starting address at which picture elements will be read out from an image memory, and selecting varying intervals on the selected horizontal lines for reading out the contents of the image memory and presenting the contents to a video display.

13. A video imaging system for use with a video signal source comprising an image mmeory, first and second programmable memories, an image memory address counter for addressing said image memory, a first counter synchronized with the video signal source, said first counter generating addresses for said first programmable memory the contents of which are used to enable or disable writing to said image memory for each line in a video raster that is to have picture elements digitized and written to said image memory, said first programmable memory also providing a starting address for said image memory address counter, said image memory address counter generating addresses at which picture elements will be written to said image memory, and means for selecting pixels on selected horizontal lines including a second counter synchronized with the video signal source, said second counter providing addresses to said second programmable memory, the contents of which contain one value for picture elements to be stored in said image memory and another value for picture elements that are not to be stored in said image memory.

14. The video imaging system of claim 13 further comprising a register for storing an offset value to be loaded into said first counter for scrolling an image area in a vertical direction on a video raster.

15. The video imaging system of claim 13 further comprising a register for storing an offset value to be loaded into said second counter for panning an image area in a horizontal direction on a video raster.

16. A video imaging system comprising an image memory, first and second programmable memories, a first counter synchronized with a video signal source, said first counter generating addresses for said first programmable memory, the contents of which are used to enable or disable reading from said image memory for each line in a video raster that is to have picture elements displayed, said first counter also generating addresses from which picture elements will be read from said image memory, and means for selecting pixels to be displayed on selected horizontal lines including a second counter synchronized to the video signal source, said second counter providing addresses to said second programmable memory the contents of which contain one value for picture elements which are to change from the last picture element displayed and another value for picture elements that are not change from the last picture element displayed.

17. A video imaging system as recited in claim 16 further including a source of pixel clock signals having a frequency that is an integral multiple of the horizontal scanning frequency, and means for combining said pixel clock signal with output of siad second programmable memory.

18. A video imaging sytem as recited in claim 17 wherein said combining means includes means for providing an AND function.

19. The video imaging system of claim 16 further comprising a register for storing an offset value to be loaded into said first counter for scrolling the displayed picture elements in a vertical direction on the video raster.

20. The video imaging system of claim 16 further comprising a register for storing the offset value to be loaded into said second counter for panning the displayed picture elements in a horizontal direction on the video raster.

21. Apparatus for acquiring image information from an image information source representing pixels of the image in a raster format having a plurality of scanning lines each containing a plurality of pixels, comprising:
pixel sample data means having stored therein information defining predetermined pixels along a scanning line to be acquired;
means for storing the acquired predetermined pixels in an addressable format; and
means for storing addresses of the image storing means having stored therein data defining the first pixel of each image, wherein said address storing means includes means for storing addresses of the image storing means having stored therein data defining the first pixel of each scanning line.

22. Apparatus for acquiring image information from an image information source representing pixels of the image in a raster format having a plurality of scanning lines each containing a plurality of pixels, comprising:
pixel sample data means having stored therein information defining predetermined pixels along a scanning line to be acquired;
means for storing acquired image pixel information in an addressable format; and
means for storing an address of the image storing means having stored therein data defining the first pixel of an image;
wherein said pixel sample data means has a plurality of storage locations, each corresponding to one pixel on a scanning line, and wherein each storage location contains a first digital indication if the corresponding pixel is to be acquired and a second digital indication if the corresponding pixel is not to be acquired.

23. Apparatus as recited in claim 22 further including a source of pixel clock signals having a frequency that is an integral multiple of the horizontal scanning frequency, and means for combining said pixel clock signal with the output of said pixel sample data means.

24. A video imaging system as recited in claim 23 wherein said combining means includes means for providing an AND function.

25. Apparatus as recited in claim 22 further including means responsive to said image pixel information storing means, said pixel sample data means and said address storing means for displaying the stored image.

26. Apparatus as recited in claim 25 wherein said display means is responsive to said pixel sample data means for displaying the next pixel information stored in the image pixel information storing means in response to said first digital indication from the pixel sample data means and for displaying previously displayed pixel information in response to said second digital indication from said pixel sample data means.

27. Apparatus as recited in claim 25 wherein said pixel sample data means further has stored therein information defining whether said predetermined pixels are to be acquired or displayed.

28. Apparatus as recited in claim 27 wherein said display means includes a display monitor having a display screen, said apparatus further having means responsive to the information defining whether predetermined pixels are to be acquired or displayed for causing a previously acquired image to be stored in one area of the screen and a currently acquired image to be displayed on another area of the screen.

29. Apparatus as recited in claim 28 wherein said previously acquired image is obtained from a remote location and said currently acquired image is a locally generated image, said system further including means for receiving the previously acquired image from the remote location and for transmitting the currently acquired image to the remote location.

30. Apparatus for displaying stored image information representing pixels of the image forming a raster having a plurality of scanning lines each containing a plurality of pixels, comprising:
   means for storing pixel information in an addessable format;
   pixel sample data means having stored therein information defining predetermined pixels along a scanning line to be displayed;
   means for storing addresses of the storing means having stored therein data defining the first pixel of each scanning line; and
   means responsive to said address storing means and the pixel sample data means for sequentially displaying the pixels stored in the image pixel information storing means addressed by the address storing means and the pixel sample data means;
   wherein said pixel sample data means includes means for providing a digital indication each time different stored pixel information is to be displayed, and wherein said image pixel information storing means is responsive to said digital indication for addressing the location containing the next stored image pixel information in response to said digital indication.

31. Apparatus for displaying stored image information pixels of the image forming a raster having a plurality of scanning lines each containing a plurality of pixels, comprising:
   means for storing pixel information in an addressable format;
   pixel sample data means having stored therein information defining predetermined pixels along a scanning line to be displayed;
   means for storing addresses of the storing means having stored therein data defining the first pixel of each scanning line; and
   means responsive to said address storing means and the pixel sample data means for sequentially displaying the pixels stored in the image pixel information storing means addressed by the address storing means and the pixel sample data means;
   said apparatus further including means for digitizing an image, and wherein said pixel sample data means includes means for providing a digital indication each time different digitized pixel information is to be stored, and wherein said image pixel information storing means is responsive to said digital indication for addresing the address in which the first pixel of each scanning line is to be stored.

32. A system for acquiring, displaying, transmitting and receiving video information, comprising:
   a first source of video information representing pixels of an image in a raster format having a plurality of scanning lines each containing a plurality of pixels;
   means including a display screen for displaying image information;
   means for transmitting video information to a remote location and for receiving video information from the remote location;
   means responsive to said first source of video information for digitizing said video information and displaying the digitized information on a first area of said display screen;
   means responsive to video information received from the remote location for displaying the video information received from the remote location on a second area of said display screen; and
   control means for rendering said transmitting means operative to transmit the displayed digitized video information to the remote location.

33. Apparatus as recited in claim 32 wherein said digitizing means further includes pixel sample data means having stored therein information defining predetermined pixels along a scanning line to be acquired.

34. Apparatus as recited in claim 33 wherein said digitizing means comprises:
   means for storing the digitized information in an addressable format; and
   means for storing addresses of the storing means having stored therein data defining the first pixel of each scanning line.

35. Apparatus as recited in claim 33 wherein said pixel sample data means has a plurality of storage locations, each corresponding to one pixel on a scanning line, and wherein each storage location contains a first digital indication if the corresponding pixel is to be stored and a second digital indication if the corresponding pixel is to be displayed.

36. Apparatus as recited in claim 35 further including means for storing an image received from the remote location, said pixel sample data means and said address storing means for displaying the image stored in the storing means.

* * * * *